US009786992B2

(12) United States Patent
Denis (10) Patent No.: US 9,786,992 B2
(45) Date of Patent: Oct. 10, 2017

(54) SYSTEM AND METHOD FOR CAVITY-BACKED ANTENNA

(71) Applicant: ILLINOIS TOOL WORKS INC., Glenview, IL (US)

(72) Inventor: Marc Lee Denis, Lena, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 150 days.

(21) Appl. No.: 14/488,803

(22) Filed: Sep. 17, 2014

(65) Prior Publication Data
US 2016/0079677 A1    Mar. 17, 2016

(51) Int. Cl.
| B23K 101/00 | (2006.01) |
| B23K 101/04 | (2006.01) |
| H01Q 13/18 | (2006.01) |
| H01Q 1/44 | (2006.01) |
| B23K 37/00 | (2006.01) |
| B23K 31/02 | (2006.01) |
| B23K 9/095 | (2006.01) |

(52) U.S. Cl.
CPC .............. *H01Q 13/18* (2013.01); *B23K 9/095* (2013.01); *B23K 31/02* (2013.01); *B23K 37/00* (2013.01); *H01Q 1/44* (2013.01)

(58) Field of Classification Search
CPC ...... G06K 19/07773; B23K 9/10; B23K 9/32; G05B 19/4063
See application file for complete search history.

(56) References Cited

U.S. PATENT DOCUMENTS

| 5,208,602 | A | 5/1993 | Monser |
| 6,304,226 | B1 | 10/2001 | Brown |
| D688,233 | S | * 8/2013 | Dong ........................... D14/250 |
| 8,766,875 | B2 | 7/2014 | Williams |
| 2002/0122006 | A1 | 9/2002 | Crawford |
| 2002/0168937 | A1 | 11/2002 | Clark |
| 2007/0080149 | A1* | 4/2007 | Albrecht ................. B23K 9/10 |
| | | | 219/130.01 |
| 2008/0102813 | A1 | 5/2008 | Chari |
| 2008/0116186 | A1 | 5/2008 | Luck |
| 2010/0108654 | A1 | 5/2010 | Ulrich |

(Continued)

FOREIGN PATENT DOCUMENTS

| CN | 201708353 | 1/2011 |
| EP | 2629363 | 8/2013 |

(Continued)

OTHER PUBLICATIONS

JP 10208003 A computer english translation.*

(Continued)

*Primary Examiner* — Erin Saad
(74) *Attorney, Agent, or Firm* — Fletcher Yoder P.C.

(57) ABSTRACT

A system includes a housing, a radio module, and an antenna coupled to the radio module. The housing includes a first wall having one or more openings, and the housing defines a cavity. The radio module and the antenna are disposed at least partially within the cavity of the housing. The radio module is configured to transmit or to receive a radio signal in a desired frequency spectrum via the antenna. The one or more openings are configured to contribute to the housing having a resonant frequency within the desired frequency spectrum.

20 Claims, 3 Drawing Sheets

(56) References Cited

U.S. PATENT DOCUMENTS

| | | |
|---|---|---|
| 2010/0176106 A1 | 7/2010 | Christensen |
| 2011/0006953 A1* | 1/2011 | Chiang ................. G06F 1/1616 343/702 |
| 2012/0110091 A1 | 5/2012 | Chantry |
| 2012/0268343 A1 | 10/2012 | Yanagi |
| 2013/0249749 A1 | 9/2013 | Nitta |
| 2013/0319988 A1 | 12/2013 | Beistle |
| 2014/0048522 A1 | 2/2014 | Dina |
| 2014/0049382 A1 | 2/2014 | Dina |
| 2014/0051358 A1 | 2/2014 | Dina |
| 2014/0051359 A1 | 2/2014 | Dina |
| 2014/0052832 A1 | 2/2014 | Dina |
| 2014/0263247 A1 | 9/2014 | Hillen |
| 2015/0114942 A1 | 4/2015 | Denis |
| 2016/0072175 A1 | 3/2016 | Denis |

FOREIGN PATENT DOCUMENTS

| | | | |
|---|---|---|---|
| GB | 2471753 | | 1/2011 |
| JP | 10208003 A | * | 8/1998 |
| WO | 9512223 | | 5/1995 |
| WO | 2014150118 | | 9/2014 |

OTHER PUBLICATIONS

International Search Report for PCT application No. PCT/US2015/040390, dated Oct. 6, 2015, 11 pgs.

Yang, Fan and Yahay Rahmat-Samii; "Electromagnetic Band Gap Structures in Antenna Engineering," Cambridge University Press, 2009, pp. 108-109.

International Search Report for PCT application No. PCT/US2015/03992, dated Oct. 6, 2015, 11 pgs.

* cited by examiner

SYSTEM AND METHOD FOR CAVITY-BACKED ANTENNA

BACKGROUND

The invention relates generally to wireless communications and, more particularly, to systems and methods for wireless communications in a welding system.

Welding is a process that has increasingly become utilized in various industries and applications. Such processes may be automated in certain contexts, although a large number of applications continue to exist for manual welding operations. In both cases, such welding operations rely on communication between a variety of types of equipment (e.g., devices) to ensure that welding operations are performed properly.

Certain welding systems may include devices that communicate with each other using wired communication, while other welding systems may include devices that communicate with each other using wireless communication. A wireless communication system utilizes a radio module coupled to an antenna to receive or transmit electromagnetic waves for wireless communication. Unfortunately, some antennas (e.g., whip antenna, dipole, rubber ducky antenna) tuned for wavelengths used for wireless communications within or among welding systems may be relatively large, bulky, or obtrusive. Additionally, regulations on wireless transmissions may specify various characteristics of wireless communications systems to reduce electromagnetic interference, which may increase design costs for yet unapproved antennas.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a housing, a radio module, and an antenna coupled to the radio module. The housing includes a first wall having one or more openings, and the housing defines a cavity. The radio module and the antenna are disposed at least partially within the cavity of the housing. The radio module is configured to transmit or to receive a radio signal in a desired frequency spectrum via the antenna. The one or more openings are configured to contribute to the housing having a resonant frequency within the desired frequency spectrum.

In another embodiment, a welding system includes a wireless communications circuitry component and a welding device. The welding device includes an enclosure and a housing disposed at least partially within the enclosure. The housing includes one or more openings, a radio module at least partially disposed within the housing, and an antenna coupled to the radio module and disposed at least partially within the housing. The radio module is configured to communicate wirelessly with the wireless communications circuitry component with a radio signal in a desired frequency spectrum via the antenna. The housing is resonant at a frequency within the desired frequency spectrum, and a configuration of the one or more openings is configured to increase a gain of the radio signal within the desired frequency spectrum.

In another embodiment, a method includes disposing an antenna at least partially within a housing, disposing a radio module at least partially within the housing, and coupling the radio module to the antenna. The radio module is configured to control the antenna to transmit a radio signal in a desired frequency spectrum, and the housing is resonant with the radio signal in the desired frequency spectrum.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the present disclosure. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
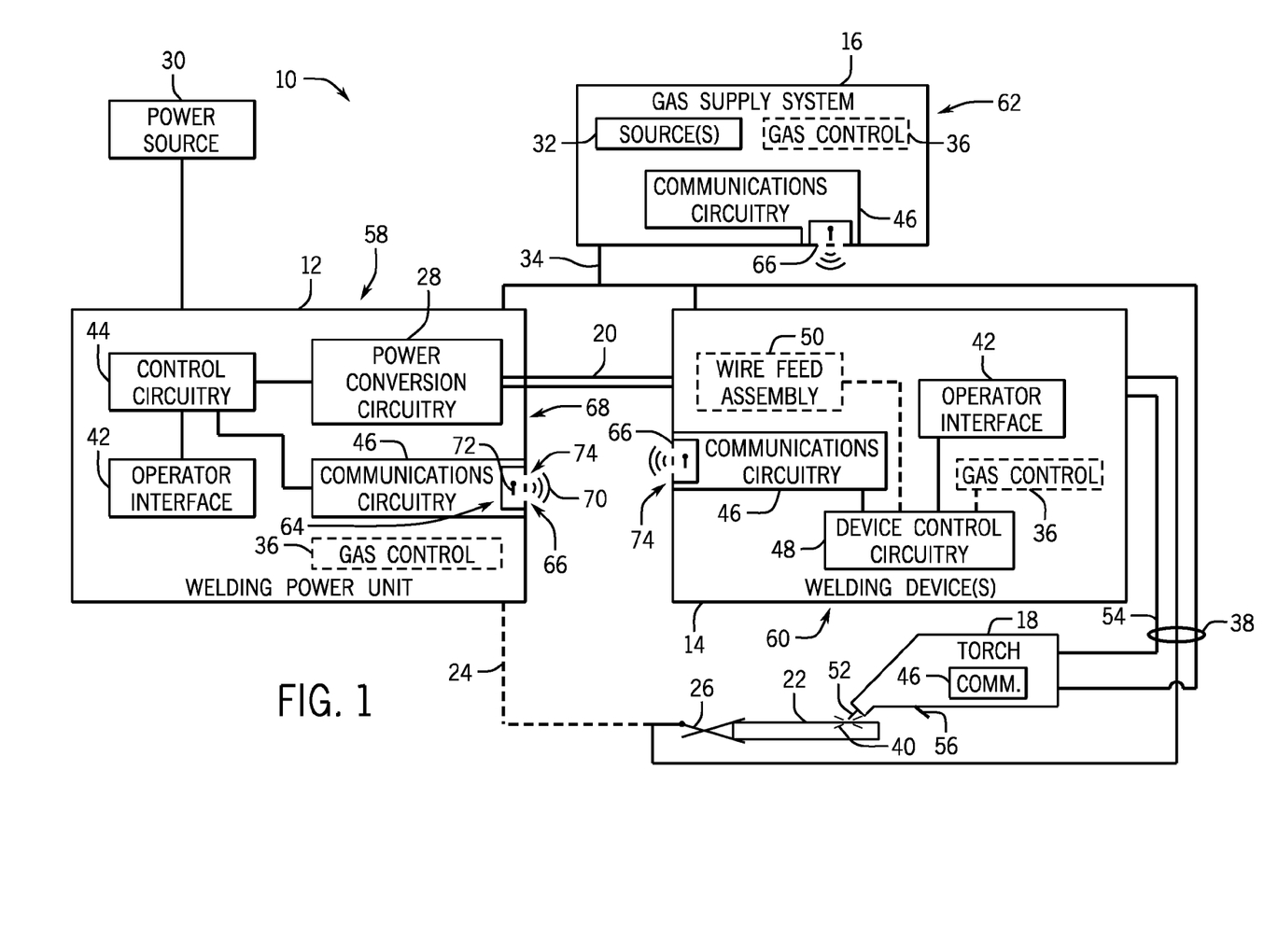
FIG. 1 illustrates an embodiment of a welding system with a cavity-backed antenna system, in accordance with the present disclosure.

Turning to the figures, FIG. 1 illustrates an embodiment of a welding system 10 (e.g., a gas metal arc welding (GMAW) system) where a welding power unit 12 and one or more welding devices 14 may be utilized together in accordance with aspects of the present disclosure. It should be appreciated that, while the present discussion may focus specifically on the GMAW system 10 illustrated in FIG. 1, the presently disclosed communication methods may be used in systems using any type of arc welding process (e.g., FCAW, FCAW-G, GTAW (i.e., TIG), SAW, SMAW, or similar arc welding process). Furthermore, although the present disclosure specifically relates to communications among welding devices, the communications methods provided herein may be applied to any two devices utilized together.

As illustrated, the welding system 10 includes the welding power unit 12, the welding device 14 (e.g., a welding wire feeder, remote device, pendant, remote control), a gas supply system 16, and a welding torch 18. In some embodiments, the welding device 14 is a welding helmet. The welding power unit 12 generally supplies welding power (e.g., electrical power at a voltage, current, and so forth, suitable for use in a welding process) to the welding system 10, and the welding power unit 12 may be coupled to the welding device 14 via a cable bundle 20 as well as coupled to a workpiece 22 using a work cable 24 having a clamp 26. The work cable 24 may be integrated with or separate from the cable bundle 20.

In some embodiments, the cable bundle 20 includes a wired communication line between the welding power unit 12 and the welding device 14. For example, in certain embodiments, the welding power unit 12 may communicate with the welding device 14 via power line communication where data is provided (e.g., transmitted, sent, transferred, delivered) over welding power (e.g., over the same physical electrical conductor). As will be appreciated, the welding power unit 12 may communicate (e.g., receive and/or transmit signals) with the welding device 14 using any suitable wired or wireless protocol (e.g., RS-232, RS-485, Ethernet, a proprietary communication protocol). In certain embodiments, the welding power unit 12 and the welding device 14 may communicate using a wired communication line that links the welding power unit 12 and the welding device 14 via a network (e.g., Internet, intranet). For example, both the welding power unit 12 and the welding device 14 may be wired to the Internet using an Ethernet cable. Accordingly, the welding power unit 12 may communicate with the welding device 14 via the Internet. In some embodiments, the welding power unit 12 and the welding device 14 may communicate (e.g., either directly or indirectly via a network) using a wireless radio signal (e.g., Wi-Fi, Bluetooth, Zigbee, cellular). For example, a cellular radio signal may communicate via standards including, but not limited to, the Code Division Multiple Access (CDMA) standard, the Global System for Mobile Communications (GSM) standard, or any combination thereof.

The welding power unit 12 may generally include power conversion circuitry 28 that receives input power from a power source 30 (e.g., an AC power grid, an engine/generator set, or a combination thereof), conditions the input power, and provides DC or AC output power via the cable bundle 20. As such, the welding power unit 12 may power the welding device 14 that, in turn, powers the welding torch 18, in accordance with demands of the welding system 10. The work cable 24 terminating in the clamp 26 couples the welding power unit 12 to the workpiece 22 to close the circuit between the welding power unit 12, the workpiece 22, and the welding torch 18. The power conversion circuitry 28 may include circuit elements (e.g., transformers, rectifiers, switches, boost converters, buck converters, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10.

The illustrated welding system 10 includes the gas supply system 16 that supplies a shielding gas or shielding gas mixtures from one or more shielding gas sources 32 to the welding torch 18. The gas supply system 16 may be directly coupled to the welding power unit 12, the welding device 14, and/or the torch 18 via a gas conduit 34. A gas control system 36 having one or more valves respectively coupled to the one or more shielding gas sources 32 may regulate the flow of gas from the gas supply system 16 to the welding torch 18. The gas control system 36 may be integrated with the welding power unit 12, the welding device 14, or the gas supply system 16, or any combination thereof.

A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit relative to the filler metal and/or base metal, and so forth). In general, the shielding gas is provided at the time of welding, and may be turned on immediately preceding the weld and/or for a short time following the weld. In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via conduit 34) may include Ar, $Ar/CO_2$ mixtures, $Ar/CO_2/O_2$ mixtures, Ar/He mixtures, and so forth.

In the illustrated embodiment, the welding device 14 is coupled to the welding torch 18 via a cable bundle 38 in order to supply consumables (e.g., shielding gas, welding wire) and welding power to the welding torch 18 during operation of the welding system 10. In another embodiment, the cable bundle 38 may only provide welding power to the welding torch 18. During operation, the welding torch 18 may be brought near the workpiece 22 so that an arc 40 may be formed between the consumable welding electrode (i.e., the welding wire exiting a contact tip of the welding torch 18) and the workpiece 22.

The welding system 10 is designed to allow for data settings (e.g., weld parameters, weld process) to be selected or input by the operator, particularly via an operator interface 42 provided on the welding power unit 12. The operator interface will typically be incorporated into a front faceplate of the welding power unit 12, and may allow for selection of settings. The selected settings are communicated to control circuitry 44 within the welding power unit 12. The control circuitry 44, described in greater detail below, operates to control generation of welding power output from the welding power unit 12 that is applied to the welding wire by the power conversion circuitry 28 for carrying out the desired welding operation. The control circuitry 44 may control the power conversion circuitry 28 based at least in part on data settings received via the operator interface 42, data settings received via communications circuitry 46 of the welding power unit 12, or any combination thereof. As discussed in detail below, the data settings received via the communications circuitry 46 may be received via a wired and/or wireless connection with one or more networked devices, such as another welding power unit 12, welding device 14, gas supply system 16, torch 18, a sensor, a work station, a server, and so forth, or any combination thereof. As discussed in detail below, the welding system 10 may include multiple communications circuitry modules 46 within the welding power unit 12, the one or more welding devices 14, the gas supply system 16, the torch 18, or any combination thereof. The communications circuitry modules 46 of components of the welding system 10 may be communicatively coupled (i.e., paired, networked) with one another over one or more of a variety of communication channels including, but not limited to, power line communication, RS-232, RS-485, Ethernet, Wi-Fi, WiMAX, Zigbee, Bluetooth, another Institute of Electrical and Electronics Engineers (IEEE) standard (e.g., 802.11, 802.15), cellular (e.g., cellular digital packet data), high speed circuit switched data, multichannel multipoint distribution service, local multipoint distribution service, or any combination thereof. In some embodiments, the communications circuitry modules 46 and operator interfaces 42 may enable data settings (e.g., wire feed speeds, weld processes, currents, voltages, arc lengths, power levels) to be set on one or more components of the welding system 10, such as the welding power unit 12, the one or more welding devices 14, the gas supply system 16, the torch 18, or any combination thereof. Additionally, or in the alternative, data settings stored in a memory and/or a database may be transmitted to the communications circuitry 46 from a computer, a workstation, a server, or any combination thereof.

Device control circuitry 48 of the one or more welding devices 14 may control various components of the respective welding device 14. In some embodiments, the device control circuitry 48 may receive input from an operator interface 42 of the welding device 14 and/or input from the communications circuitry 46 of the welding device 14. In some embodiments, the one or more welding devices 14 may include a wire feeder having a wire feed assembly 50 controlled by the device control circuitry 48. The wire feed assembly 50 may include, but is not limited to, a motor, drive wheels, a spool, or power conversion circuitry, or any combination thereof. The device control circuitry 48 may control the feed of welding wire from the spool to the torch 18 in accordance with input received via the operator interface 42 or the communications circuitry 46 for a desired welding application. In some embodiments, the operator interface 42 of the welding device 14 may enable the operator to select one or more weld parameters, such as wire feed speed, the type of wire utilized, the current, the voltage, the power settings, and so forth.

During a welding application, power from the welding power unit 12 is applied to an electrode 52 (e.g., wire), typically by means of a weld cable 54 of the cable bundle 38 coupled to the torch 18. Similarly, shielding gas via the gas conduit 34 may be fed through the cable bundle 38 to the torch 18. In some embodiments, the wire 42 is advanced through the cable bundle 38 towards the torch 18 during welding operations. When a trigger switch 56 on the torch 18 is actuated, communications circuitry 46 in the torch 18 may be configured to provide a signal (e.g., wired or wireless) to the welding power unit 12, the welding device 14, or the gas supply system 16, or any combination thereof, thereby enabling the welding process to be started and stopped by the operator. That is, upon depression of the trigger switch 56, gas flow is begun, a wire may be advanced, and power is applied to the weld cable 54 and through the torch 16 for the welding application. In some embodiments, the communications circuitry 46 in the torch 18 may facilitate communication between the torch 18 and other components of the welding system 10 during the welding application.

Components of the welding power unit 12, the welding device 14, and the gas supply system 16 may be disposed at least partially within respective enclosures. For example, the control circuitry 44, power conversion circuitry 28, communications circuitry 46, and the gas control 36 of the welding power unit 12 are arranged within a first enclosure 58. The operator interface 42 may be integrated with and/or mounted to the first enclosure 58. In a similar manner, a second enclosure 60 may at least partially enclose components of the welding device 14, such as the gas control 36, the operator interface 42, the communications circuitry 46, the welding device control circuitry 48, and the wire feed assembly 50. A third enclosure 62 may at least partially enclose components of the gas supply system 16, such as the shielding gas sources 32, the gas control 36, and communications circuitry 46. As may be appreciated, the enclosures 58, 60, 62 may partially enclose or substantially fully enclose components of the respective systems. For example, the enclosures may have access ports and/or panels to facilitate operator access to components (e.g., controls, connectors, I/O ports) disposed within the enclosure. Walls of the enclosures may provide at least some environmental protection for the components disposed therein. Additionally, or in the alternative, the enclosures may include one or more openings for ventilation and/or drainage.

In some embodiments, a housing 64 of the communications circuitry 46 may be at least partially integrated with an enclosure of the welding system 10. For example, an emission face 66 (e.g., a face from which wireless signals 70 are emitted) of the housing 64 may be a portion of an external face 68 of the first enclosure 58 about the welding power unit 12. In some embodiments, the housing 64 may be mounted in a recess of an enclosure (e.g., first enclosure 58) such that the emission face is substantially flush with an external face of the enclosure. The emission face 66 is a conformal antenna (e.g., slot antenna) that emits or receives radio signals via designed openings 74, as discussed in detail below. In some embodiments, the housing 64 is resonant with radio signals within a desired frequency spectrum that is utilized by an antenna 72. The resonance of the housing 64 with the radio signals in a desired frequency spectrum transmitted by the antenna 72 enables the communications circuitry 46 to efficiently transmit the radio signals via the emission face 66 of the housing 64, thereby reducing the profile and bulk of the communications circuit 46 without significantly affecting the power of the radio signals transmitted with other communications circuits 46 within the welding system 10. As discussed in detail below, various features of the housing 64 and the emission face 66 may affect the gain and/or directionality of a wireless signal 70 emitted from the housing 64. The various features that may affect the wireless signal 70 may include, but are not limited to, the shape of the housing 64 (e.g., curved, angular, rectangular, etc.), the geometry of the housing 64 (e.g., length, width, height, cavity volume, etc.), whether the cavity is fully enclosed except for the one or more designed openings 74, the position of the antenna 72 within the housing 64, the materials of the housing 64, the materials of the antenna 72, a dielectric medium within the housing 64, and the configuration of one or more designed openings 74 of the emission face 66 of the housing 64, or any combination thereof. The housing 64 at least partially encompasses the antenna 72, thereby forming a cavity-backed antenna.

Figure 2:
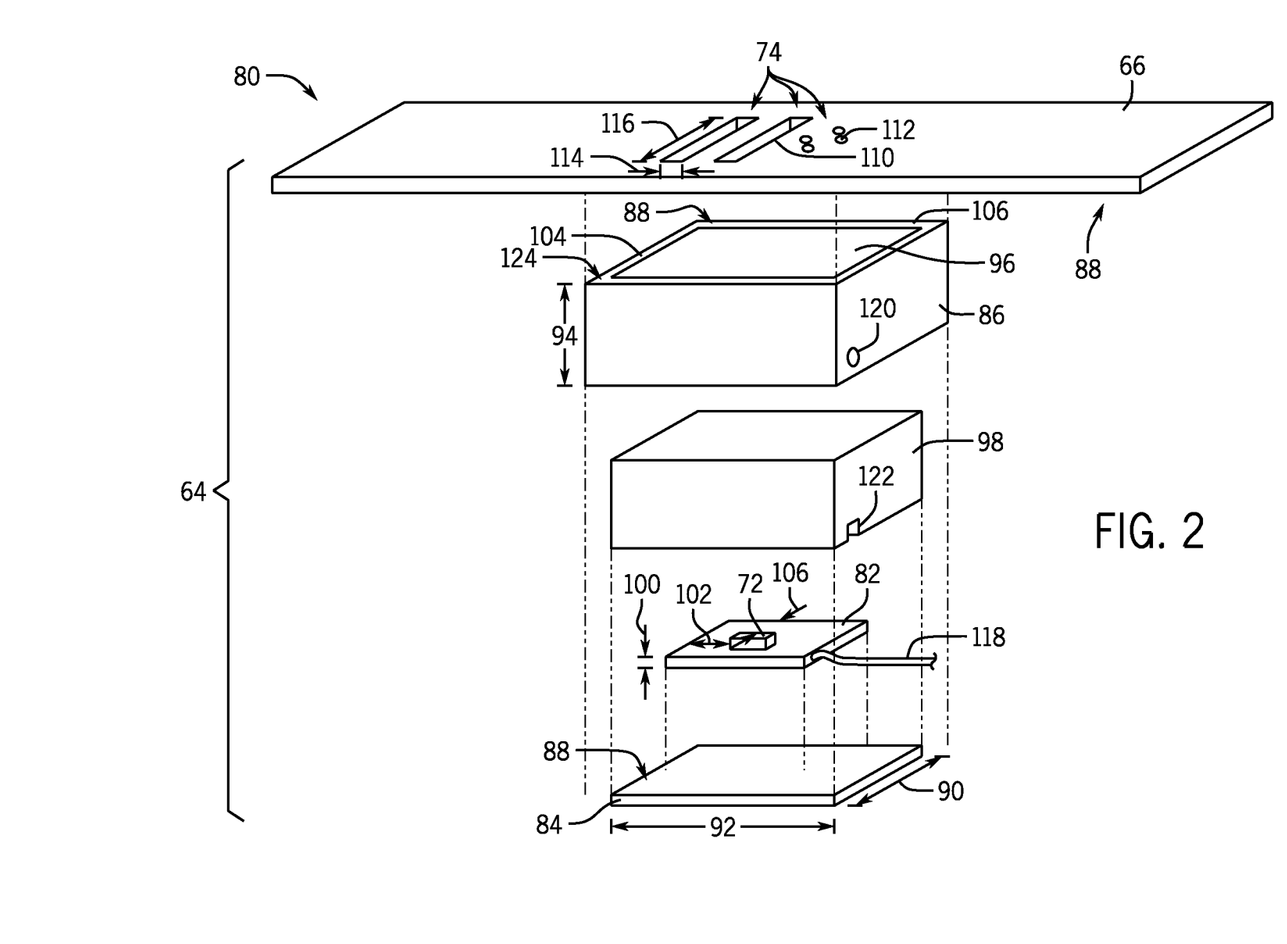
FIG. 2 illustrates an assembly view of an embodiment of a cavity-backed antenna system.

FIG. 2 illustrates an assembly view of an embodiment of a cavity-backed antenna system 80 of the communications circuitry 46. The communications circuitry 46 of the welding power unit 12, the welding device 14, the gas supply system 16, and/or the torch 18 may include an embodiment of the cavity-backed antenna system 80 as described in detail below. The cavity-backed antenna system 80 includes the housing 64, the antenna 72, and a radio module 82. The radio module 82 is coupled to the antenna 72, and the radio module 82 is disposed at least partially within the housing 64 with the antenna 72. The antenna 72 may be separate from or integrally formed with the radio module 82. That is, where the radio module 82 is disposed on a printed circuit board, the antenna 72 may be a printed element of the printed circuit board. In some embodiments, the antenna 72 is a monopole antenna. The radio module 82 may include, but is not limited to, processing circuitry (e.g., wireless transmitter) configured to transmit information via one or more radio signals in a desired frequency spectrum (e.g., 100 MHz to 20 GHz, 300 MHz to 10 GHz, 800 MHz to 5 GHz, 1 GHz to 2.5 GHz), processing circuitry (e.g., wireless receiver) configured to receive information via one or more radio signals, or any combination thereof (e.g., wireless transceiver). In some embodiments, the antenna 72 is integrated with the radio module 82.

The housing 64 is configured to at least partially encompass the radio module 82 and the antenna 72. In some embodiments, the housing 64 fully encloses the antenna 72. The housing 64 may have multiple components, such as a base 84, walls 86, and the emission face 66. In some embodiments, the emission face 66 is one of the walls 86. In some embodiments, one or more components of the housing 64 may be integrated with one another and/or formed together. For example, the housing 64 may be formed (e.g., folded) from a sheet of a housing material including, but not limited to, aluminum, copper, steel (e.g., stainless steel), metalicized plastic, or any combination thereof. In some embodiments, the housing 64 may have one or more layers of aluminum, copper, steel (e.g., stainless steel), plastic, a quartz material, a printed circuit board, a flexible printed circuit board, or any combination thereof. In some embodiments, the housing 64 may have an electrically conductive inner face 88, thereby electrically coupling the radio module 82 to the housing 64. For example, the radio module 82 may be electrically coupled to the emission face 66, thereby enabling the emission face 66 with the designed openings 74 to directly receive or transmit the radio signals with the radio module 82. Additionally or in the alternative, the electrically conductive emission face 66 passively re-emits radio signals received from the antenna 72 or from the communications circuitry 46 of other components of the welding system 10.

In some embodiments, the housing 64 may shield the antenna 72 from external electromagnetic interference. For example, the housing 64 may have one or more layers of different materials to shield the radio module 82 and the antenna 72 from high frequency and low frequency electromagnetic interference. Shielding by the housing 64 may enable the antenna 72 to be coupled to the radio module 82 via an unshielded electrical connection. Additionally, or in the alternative, one or more walls 86 may be coupled to the base 84 and/or the emission face 66 via a fastener, an adhesive, a weld, a braze, an interference fit, or any combination thereof. In some embodiments, the emission face 66 may be a wall 86 of the housing 64 such that the emission face 66 couples to the base 84. Moreover, while FIG. 2 illustrates the housing 64 about the radio module 82 and the antenna 72 as having a rectangular shape, a cross-sectional shape of the housing 64 may include, but is not limited to a cylinder, a sphere, a dome, a horn, or a triangular prism.

The geometry of the housing 64 may be configured to be resonant with the one or more radio signals, to affect the gain of the one or more radio signals, and/or to affect the directionality of the one or more radio signals emitted from the antenna 72. A length 90, a width 92, and a height 94 of the housing 64 may be designed to be resonant for a desired frequency range about a target frequency of radio signals utilized by the antenna 72. The power for generating radio signals is utilized more efficiently at frequencies that are resonant with an antenna, thereby reducing energy losses (e.g., heat). In a similar manner, the emission face 66 and openings 74 of the housing 64 re-emits radio signals from the antenna 72 or other communications circuits 46 more efficiently at frequencies that are resonant with the housing 64 than at frequencies that are not resonant with the housing 64. That is, the cavity-backed antenna system 80 may emit radio signals at resonant frequencies of the antenna 72 and/or the housing 64 more efficiently than radio signals emitted at non-resonant frequencies. The antenna 72 transfers energy to the emission face 66 and the openings 74 via the emitted radio signals, and the emission face 66 re-emits the radio signals. Accordingly, the geometry of the housing 64 is designed to be resonant for a desired frequency range about a target frequency emitted by the antenna 72, thereby increasing the efficiency of the cavity-backed antenna system 80. Moreover, the one or more openings 74 may be designed to be designed as an antenna (e.g., slot antenna) that is resonant for a desired frequency range about a target frequency emitted by the antenna 72. For example, the one or more openings 74 may be one or more slot antennas having lengths that approximate the lengths of resonant dipole antennas for the desired frequency range about the target frequency.

The walls 86 and the emission face 66 define a cavity 96 within the housing 64. In some embodiments, walls 86, the emission face 66, and the base 84 substantially fully enclose the cavity 96, except for the one or more openings 74 and one or more ports 120. In some embodiments, the cavity 96 is not substantially fully enclosed, such as if portions of the one or more of the walls 86 or the base 86 is removed from the embodiment illustrated in FIG. 2. The antenna 72 and the radio module 82 may be disposed substantially entirely within the cavity 96, such as by mounting the radio module 82 to the base 84 within the cavity 96. In some embodiments, the radio module 82 extends at least partially through an iris of the base 84 or the walls 86 into the cavity 96. Additionally, or in the alternative, the antenna 72 may extend at least partially through the base 84 or the walls 86 into the cavity 96. In some embodiments, a dielectric medium 98 may be arranged within the cavity 96. The dielectric medium 98 may include, but is not limited to, a plastic, a foam, a resin, air, an inert gas, or any combination thereof. In some embodiments, the dielectric medium 98 may be utilized to maintain the antenna 72 and/or the radio module 82 at a desired resonant position within the housing 64. For example, the antenna 72 and/or the radio module 82 may be coupled with the dielectric medium 98. Additionally, or in the alternative, the dielectric medium 98 may have a complementary geometry (e.g., negative image) of the antenna 72 and the radio module 82. The complementary geometry of the dielectric medium 98 may mate with (e.g., abut) or be spaced a distance from the antenna 72 or the radio module 82 when the cavity-backed antenna system 80 is assembled. The dielectric medium 98 may insulate and protect the antenna 72 and/or the radio module 82 from external shocks and vibrations to the cavity-backed antenna system 80.

The antenna 72 is arranged within the enclosure 64 to enable the one or more designed openings 74 of the emission face 66 to affect the one or more emitted or received radio signals. For example, the antenna 72 may be arranged within the enclosure 64 to maintain a first spacing 100 from the base 84, a second spacing 102 from a first wall 104, and a third spacing 106 from a third wall 108. The one or more designed openings 74 of the emission face 66 may include, but are not limited to, a slot 110, a hole 112, a coil, or any combination thereof. The geometry of the one or more designed openings 74 may affect the resonant frequency, the gain, and/or the directionality of the radio signals emitted from or received by the cavity-backed antenna system 80. In some embodiments, the slots 110 are approximately rectilinear slots 110. Additionally, or in the alternative, the slots 110 have a zig-zag shape. Additionally, or in the alternative, spacing of the one or more designed openings 74 across the emission face 66 may affect the resonant frequency, the gain, and/or the directionality of the cavity-backed antenna system 80. For example, a width 114 and a length 116 of one or more slots 110 may be tuned for a resonant frequency (e.g., 2.45 GHz) that is a target frequency utilized to communicate with the communications circuits 46 of other components of the welding system 10.

Antennas transmit radio signals at the resonant frequency of the antenna with a greater efficiency than radio signals at non-resonant frequencies. The resonant frequency of an antenna system is related to the electrical length of the antenna system, where the impedance of the antenna system at the resonant frequency approximates a pure resistance (e.g., no reactance) to the signal source, such as the radio module 82. A dipole antenna without any added inductance or capacitance may have a physical length and an electrical length approximately equal to half of the wavelength of the resonant frequency, and a monopole antenna may have a physical length and an electrical length approximately equal to one quarter of the wavelength of the resonant frequency. By adding inductance to the cavity-backed antenna system 80, the electrical length of the cavity-backed antenna system 80 may be increased without increasing the physical length, thereby increasing the resonant frequency of the cavity-backed antenna system 80 for a given physical length. Some embodiments of the cavity-backed antenna system 80 are configured to increase the electrical length of the cavity-backed antenna system 80 such that the cavity-backed antenna system 80 is resonant for a frequency range that includes the target frequency (e.g., 2.45 GHz) utilized to communicate with the communications circuits 46 of other components of the welding system 10. The electrical length of the cavity-backed antenna system 80 may be increased without increasing the bulk (e.g., footprint) of the communications circuitry 46. Moreover, increasing the electrical length of the cavity-backed antenna system 80 may enable the bulk of the communications circuitry 46 to be decreased. Accordingly, the cavity-backed antenna system 80 may streamline a profile of the communications circuitry 46 by disposing the antenna 72 within the housing 64, such that the emission face 66 of the housing 64 re-emits the radio signals as a conformal antenna (e.g., slot antenna). The housing 64 may protect the antenna 72 from external shocks or from being snagged.

The one or more resonant frequencies of the housing 64 of the cavity-backed antenna system 64 are affected by the shape of the housing 64, the geometry (e.g., length 92, width 94, height 94) of the housing 64, the position of the antenna 72 within the housing 64, the materials of the housing 64, the dielectric medium 98, the quantity of designed openings 74, the configuration of the one or more designed openings 74, the geometry of the one or more designed openings 74, or any combination thereof. Furthermore, the dielectric medium 98 disposed within the housing 64 about the antenna 72 may also electrically lengthen cavity-backed antenna system 80, thereby enabling the designed openings 74 to be shorter and/or the housing 64 to be smaller without changing the resonant frequency of the cavity backed antenna system 80. For example, increasing the dielectric constant of the dielectric medium 98 disposed within the housing 64 may enable the volume of the housing 64 to decrease without affecting the resonant frequency of the cavity-backed antenna system 80. Additionally, or in the alternative, the dielectric medium 98 enables the width 114 and/or the length 116 of the designed openings 74 to be shortened without otherwise affecting the resonant frequency. Accordingly, the housing 64 and the dielectric medium 98 may reduce the bulk of the communications circuitry 46 that may be utilized with the power supply unit 12, the welding device 14, the gas supply system 16, the torch 18, or any combination thereof.

The disposition of the radio module 82 within the housing 64 of the cavity-backed antenna system 80 reduces the bulk and footprint of the communications circuitry 46. For example, the disposition of the radio module 82 within the housing 64 reduces the quantity of components of the communications circuitry 46 that are to be installed within a component (e.g., the power supply unit 12, the welding device 14, the gas supply system 16, the torch 18, etc.) of the welding system 10. That is, the communications circuitry 46 may be the cavity-backed antenna system 80 with the integrated antenna 72 and radio module 82 disposed within, rather than a separate radio module that is external to the antenna and the housing 64. In some embodiments, the cavity-backed antenna system 80 may be a modular component that may be utilized as the communications circuitry 46 within the welding power unit 12, the welding device 14, the gas supply system 16, the torch 18, or any combination thereof.

The radio module 82 within the housing 64 may be coupled to one or more cables 118. The one or more cables 118 may supply power to the radio module 82. Additionally, or in the alternative, the one or more cables 118 may couple the radio module 82 to an operator interface 42 or control circuitry (e.g., the control circuitry 44, the gas control system 36, the device control circuitry 48, etc.). The one or more cables 118 may be coupled to the radio module 82 through a port 120 in the base 84, a wall 86, or the emission face 66. In some embodiments, the dielectric medium 98 may have one or more recesses 122 to accommodate the one or more cables 118 coupled to the radio module 82.

The emission face 66 of the housing 64 may be integrated with the walls 86 or separately coupled to the walls 86 and the base 84. In some embodiments, an open face 124 of the housing 64 may interface with the emission face 66. The emission face 66 may extend beyond the walls 86 of the housing 64, such as when the emission face 66 is an external face 68 of an enclosure. In some embodiments, the housing 64 with the emission face 66 is disposed within an enclosure (e.g., first enclosure 58, second enclosure 60, etc.).

Figure 3:
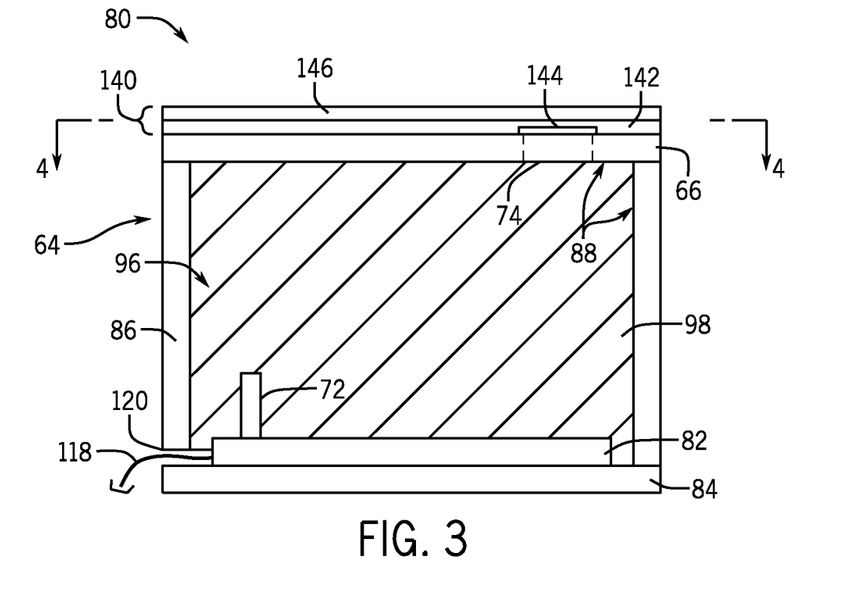
FIG. 3 illustrates a cross section of an embodiment of a cavity-backed antenna system.

FIG. 3 illustrates a cross-sectional view of an embodiment of the cavity-backed antenna system 80. As discussed above, the radio module 82 and the antenna 72 are disposed within the housing 64. The dielectric medium 98 may at least partially fill the cavity 96 between the base 84, the walls 86, and the emission face 66 of the housing 64. In some embodiments, the dielectric medium 98 may interface (e.g., directly contact) with portions of the antenna 72 and/or the radio module 82. For example, the dielectric medium 98 may maintain the position of the antenna 72 in a resonant position (e.g., spacing from the walls 86 and designed opening 74) within the housing 64. In some embodiments, the dielectric medium 98 may be spaced apart from (i.e., not directly abutting) the antenna 72 and/or the radio module 82.

One or more designed openings 74 of the emission face 66 facilitate the transmission of radio signals from cavity-backed antenna system 80 at frequencies within the desired frequency spectrum. The one or more designed openings 74 of the emission face 66 receive the transmitted radio signals from the antenna 72, and re-radiate the received radio signals at the target frequency to communicate with other communications circuits 46 of the welding system 10. In some embodiments, one or more layers 140 may be disposed over at least a portion of the one or more desired openings 74 to affect the transmission of the radio signals from the cavity-backed antenna system 80. For example, the one or more layers 140 may include a first layer 142 (e.g., foil, printed circuit elements) with one or more patterned portions 144 (e.g., radiating elements). The one or more patterned portions 144 may be electrically conductive and tuned to affect the gain of the transmitted radio signal within the desired frequency spectrum (e.g., 100 MHz to 20 GHz, 300 MHz to 10 GHz, 800 MHz to 5 GHz, 1 GHz to 2.5 GHz). The one or more layers 140 may include a second layer 146 (e.g., backing layer). For example, the one or more layers 140 may be a printed circuit board in which the first layer 142 includes electrically conductive printed patterned portions 144 to be disposed at across one or more of the designed openings 74, and the second layer 146 may be a substrate for the first layer 142. In some embodiments, the one or more layers 140 may include a label or decal, thereby enabling the one or more layers 140 to interface (e.g., adhere) with the emission face 66 and/or the housing 64. Accordingly, the one or more layers 140 may at least partially extend over the one or more designed openings 74, thereby at least partially obscuring the one or more designed openings 74 from view.

Figure 4:
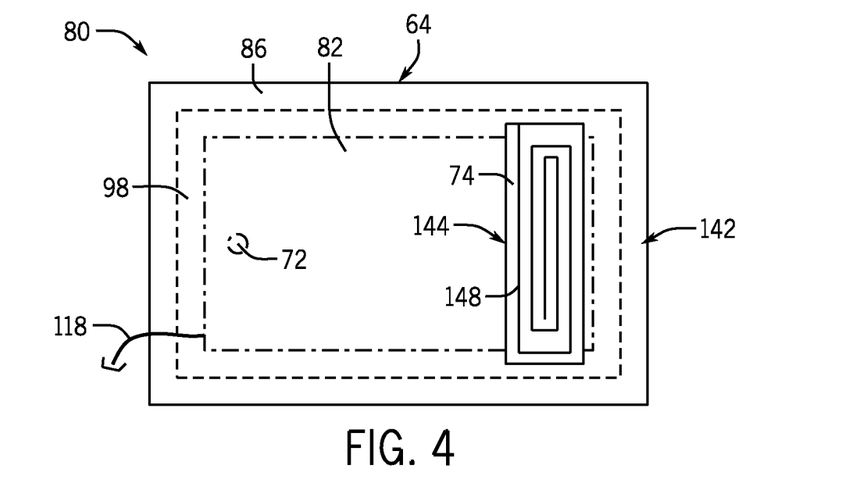
FIG. 4 illustrates a top view of an embodiment of the cavity-backed antenna system of FIG. 3, taken along line 4-4.

FIG. 4 illustrates a top view of the cavity-backed antenna system 80, taken along line 4-4 of FIG. 3. The patterned portion 144 extends at least partially across one or more designed openings 74 of the emission face 66. The patterned portion 144 may include a radiating element 148. In some embodiments, the patterned portion 144 may be stamped or cut in the one or more layers 140. Additionally, or in the alternative, the patterned portion 144 may be printed on a substrate. For example, the patterned portion 144 may include copper, aluminum, or silver features disposed on a printed circuit board (PCB) substrate. A cable 150 coupled to the radiating element 148 of the patterned portion 144 may supply a signal that enables the radiating element 148 to transmit a radio signal. The radiating element 148 may be utilized separately from or with the antenna 72 to transmit one or more radio signals. In some embodiments, the radiating element 148 augments the signal strength or directionality of the radio signals transmitted by the antenna 72 disposed within the cavity 96.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
a cavity-backed antenna system comprising:
   a housing comprising a wall, wherein the wall comprises one or more openings, and the housing defines a cavity;
   a radio module disposed at least partially within the cavity of the housing, wherein the radio module comprises processing circuitry disposed within the cavity of the housing; and
   an antenna coupled to the radio module and disposed at least partially within the cavity of the housing, wherein the processing circuitry of the radio module is configured to transmit or to receive a radio signal in a desired frequency spectrum via the antenna, wherein the one or more openings contribute to the housing having a resonant frequency within the desired frequency spectrum; and
an enclosure comprising the wall, wherein the housing of the cavity-backed antenna system is at least partially disposed within the enclosure, and the wall adjacent to the cavity is shared by the housing and the enclosure.

2. The system of claim 1, wherein the cavity-backed antenna system comprises a dielectric medium disposed within the cavity of the housing, wherein the dielectric medium comprises a plastic, a foam, a resin, a non-ferrous magnetic material, or any combination thereof.

3. The system of claim 2, wherein the dielectric medium comprises a complementary geometry of the antenna, and the complementary geometry of the antenna is configured to abut the antenna within the cavity or to be spaced a distance from the antenna within the cavity.

4. The system of claim 1, wherein the housing comprises one or more layers comprising a metal, a metalicized plastic, quartz, a printed circuit board, or any combination thereof.

5. The system of claim 1, wherein the antenna is integrally formed with the radio module.

6. The system of claim 1, wherein the enclosure encompasses a welding power unit, a welding wire feeder, a welding pendant controller, a welding remote controller, a welding gas supply system, a torch, or any combination thereof.

7. The system of claim 6, comprising a layer configured to interface with an outer face of the wall of the housing and the enclosure, wherein the layer comprises one or more printed circuit elements configured to interface with the one or more openings.

8. The system of claim 1, comprising a label disposed on the wall and configured to at least partially extend over at least one of the one or more openings of the wall.

9. The system of claim 1, wherein the desired frequency spectrum comprises a subset of a range between 200 MHz to 6 GHz.

10. A welding system comprising:
a wireless communications circuitry component; and
a welding device comprising:
   an enclosure comprising a wall; and
   a cavity-backed antenna system comprising a housing disposed at least partially within the enclosure, wherein the housing comprises a portion of the wall, and the wall is shared by the enclosure and the housing, wherein the housing comprises:
      one or more openings in the portion of the wall;
      a radio module at least partially disposed within the housing, wherein the radio module comprises processing circuitry disposed within the housing; and
      an antenna coupled to the radio module and disposed at least partially within the housing, wherein the processing circuitry of the radio module is configured to communicate wirelessly with the wireless communications circuitry component with a radio signal in a desired frequency spectrum via the antenna, the housing is resonant at a frequency within the desired frequency spectrum, and a configuration of the one or more openings is configured to increase a gain of the radio signal within the desired frequency spectrum.

11. The welding system of claim 10, wherein the welding device comprises a welding power supply unit, a welding wire feeder, a welding pendant controller, a welding remote controller, a welding gas supply system, a torch, or any combination thereof.

12. The welding system of claim 10, wherein the housing comprises a dielectric medium disposed within the housing.

13. The welding system of claim 12, wherein the dielectric medium is configured to maintain the antenna in a resonant position within the housing.

14. The welding system of claim 10, wherein the housing comprises an electrically conductive inner face.

15. A method of manufacturing comprising:
- disposing an antenna at least partially within a cavity of a housing of a cavity-backed antenna system, wherein the housing defines the cavity;
- disposing a radio module at least partially within the cavity of the housing of the cavity-backed antenna system, wherein the radio module comprises processing circuitry disposed within the cavity of the housing;
- disposing the cavity-backed antenna system within an enclosure having a wall, wherein a portion of the wall adjacent to the cavity is shared by the housing and the enclosure; and
- coupling the radio module to the antenna, wherein the processing circuitry of the radio module is configured to control the antenna to transmit a radio signal in a desired frequency spectrum, and the housing is resonant with the radio signal in the desired frequency spectrum.

16. The method of claim 15, comprising disposing a dielectric medium within the housing of the cavity-backed antenna system, wherein the dielectric medium comprises a plastic, a foam, a resin, a non-ferrous magnetic material, or any combination thereof.

17. The method of claim 15, wherein the housing comprises a stamped or printed layer of an electrically conductive material.

18. The method of claim 15, comprising coupling the radio module to a power source through the housing, wherein the power source is external to the housing of the cavity-backed antenna system.

19. The method of claim 15, comprising forming a configuration of one or more openings in the housing, wherein the configuration of the one or more openings increases a gain of the radio signal in the desired frequency spectrum.

20. The system of claim 2, wherein the dielectric medium fills the cavity within the housing.

* * * * *